United States Patent
Fujimori et al.

[11] Patent Number: 6,160,085
[45] Date of Patent: Dec. 12, 2000

[54] POLYESTER AND PROCESS FOR ITS PRODUCTION

[75] Inventors: Yoshihiro Fujimori; Takashi Nakamura; Shuuji Anno; Kazuyoshi Mino; Michiko Yoshida; Toshiyuki Hamano, all of Mie, Japan

[73] Assignee: Mitsubishi Chemical Corporation, Tokyo, Japan

[21] Appl. No.: 09/302,267

[22] Filed: Apr. 30, 1999

[30] Foreign Application Priority Data

May 6, 1998 [JP] Japan .................................. 10-123102

[51] Int. Cl.⁷ .................................................. C08G 64/00
[52] U.S. Cl. ................................................ 528/272; 528/271
[58] Field of Search ..................................... 528/271, 272

[56] References Cited

U.S. PATENT DOCUMENTS 3,951,905  4/1976  Sano et al. .............................. 528/176
5,608,032  3/1997  Yuo et al. ............................... 528/286

OTHER PUBLICATIONS

Derwent Abstract JP 11021338 A.
Derwent Abstract JP 11021337 A.
Derwent Abstract JP 10110026 A.
Derwent Abstract JP 10087807A.
Derwent Abstract JP 10067924A.

*Primary Examiner*—Terressa M. Boykin
*Attorney, Agent, or Firm*—Oblon, Spivak, McClelland, Maier & Neustadt, P.C.

[57] ABSTRACT

A polyester which is characterized in that (1) it comprises ethylene terephthalate units as the main constituting component, (2) its intrinsic viscosity is from 0.6 to 0.9 dl/g, (3) the content of an antimony element is from 0.8 to 2.0 mmol/kg, (4) the temperature-rising crystallization peak temperature ($Tc_1$) is at least 160° C., and the temperature-dropping crystallization peak temperature ($Tc_2$) is at most 170° C. or non-existent, and (5) the number ($N_1$) of spherulites when it is heated from room temperature to 120° C. and maintained for 10 minutes is at most $1 \times 10^{-2}/\mu m^2$, and the number ($N_2$) of spherulites when it is cooled from 300° C. to 200° C. and maintained for 2 minutes is at most $1 \times 10^{-3}/\mu m^2$.

11 Claims, 1 Drawing Sheet

POLYESTER AND PROCESS FOR ITS PRODUCTION

BACKGROUND OF THE INVENTION

1. Field of the Invention

The present invention relates to a polyester comprising ethylene terephthalate units as the main constituting component, which is suitable for production of e.g. stretch blow molded products required to have heat resistance. Further, the present invention relates to a process for producing such a polyester.

2. Discussion of Background

A polyester (hereinafter sometimes referred to as PET) comprising ethylene terephthalate units as the main constituting component, is widely used for containers for e.g. foods or beverages. In particular, as a container for a beverage required to be sterilized and filled under heating, such as mineral water, it is common to employ one obtained by producing a bottomed tubular preform by injection molding, then heating and softening it by e.g. an infrared ray heater, putting it in a mold, followed by stretch blow molding to obtain a container having a predetermined shape, and further applying heat treatment thereto to improve the heat resistance. Heretofore, for this application, PET produced by means of a germanium catalyst has been mainly employed. Especially in an application where high heat resistance is required, PET produced by means of an antimony catalyst has not been employed, as the heat resistance has been inadequate. The reason is that with PET produced by means of an antimony catalyst, the crystallization rate is high, and crystallization is likely to take place during the heating of the preform, whereby uniform stretch blow molding can hardly be carried out. As a method to avoid crystallization during the heating, it is conceivable to shorten the heating time of the preform, but by such a method, the preform may not sufficiently be heated, whereby the molecular motion is suppressed, and no adequate crystal orientation or relaxing of an orientation strain can take place during the subsequent heat treatment, whereby no adequate heat resistance will be obtained.

As another method, it is conceivable to reduce the crystallization rate of the resulting PET by employing a large amount of the copolymer component during the production of PET. However, in such a method, even if a molded product obtained by stretch blow molding, is subjected to heat treatment, the crystal orientation and relaxing of an orientation strain can not adequately proceed as they are hindered by the copolymer component, whereby improvement in the heat resistance tends to be also inadequate.

An antimony catalyst is inexpensive as compared with a germanium catalyst. Accordingly, it is industrially significant to employ an antimony catalyst to produce PET capable of presenting a container rich in heat resistance, and various proposals have heretofore been made. For example, JP-A-7-145233 discloses that PET produced by using trimethylphosphoric acid, magnesium acetate and antimony trioxide, is excellent in transparency and heat resistance and has a small content of acetaldehyde. However, according to the study by the present inventors, this PET does not satisfy a high level of heat resistance required for a container to be used in an application where heat sterilization and filling at a high temperature are required, although the transparency is improved.

SUMMARY OF THE INVENTION

As described above, PET produced by means of an antimony catalyst, which presents a container having heat resistance of a high level by stretch blow molding, has not yet been developed. Accordingly, it is an object of the present invention to provide such PET.

The present invention provides a polyester which is characterized in that (1) it comprises ethylene terephthalate units as the main constituting component, (2) its intrinsic viscosity is from 0.6 to 0.9 dl/g, (3) the content of an antimony element is from 0.8 to 2.0 mmol/kg, (4) the temperature-rising crystallization peak temperature ($Tc_1$) is at least 160° C., and the temperature-dropping crystallization peak temperature ($Tc_2$) is at most 170° C. or nonexistent, and (5) the number ($N_1$) of spherulites when it is heated from room temperature to 120° C. and maintained for 10 minutes is at most $1\times10^{-2}/\mu m^2$, and the number ($N_2$) of spherulites when it is cooled from 300° C. to 200° C. and maintained for 2 minutes is at most $1\times10^{-3}/\mu m^2$.

DETAILED DESCRIPTION OF THE PREFERRED EMBODIMENTS

Figure 1:
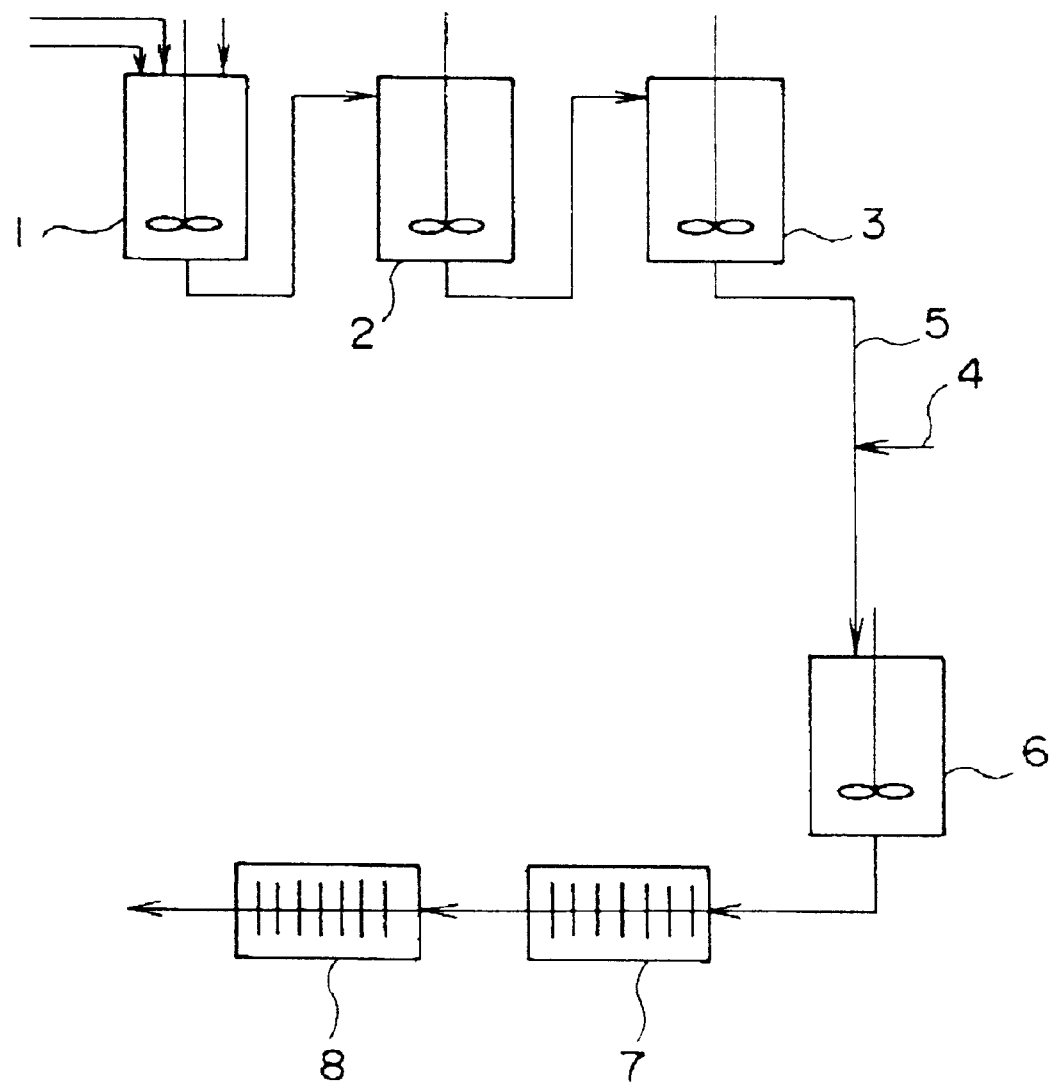
FIG. 1 is an example of the apparatus for producing a polyester by the process of the present invention.

The polyester according to the present invention, is a polyester which essentially comprises a terephthalic acid component and an ethylene glycol component, but, a component other than the terephthalic acid component and the ethylene glycol component, may be copolymerized if it is in a small amount. As such a copolymerizable component, a bifunctional one may usually be employed. For example, as a dicarboxylic acid component, an aromatic dicarboxylic acid such as naphthalene dicarboxylic acid, isophthalic acid, orthophthalic acid, cyclohexane dicarboxylic acid, dibromoisophthalic acid, sodium sulfoisophthalate, biphenyl dicarboxylic acid, biphenylether dicarboxylic acid, biphenylsulfone dicarboxylic acid, biphenylketone dicarboxylic acid, biphenoxyethane dicarboxylic acid or phenylenedioxy dicarboxylic acid, or an aliphatic dicarboxylic acid such as adipic acid, sebacic acid, succinic acid, glutaric acid, pimelic acid, suberic acid, azelaic acid, undecane dicarboxylic acid or dodecane dicarboxylic acid, may be mentioned.

Further, as a diol component, an aliphatic glycol such as trimethylene glycol, tetramethylene glycol, pentamethylene glycol, hexamethylene glycol, octamethylene glycol, decamethylene glycol, propylene glycol, diethylene glycol, polyethylene glycol or polyoxytetramethylene glycol, an alicyclic glycol such as 1,4-cyclohexane dimethanol or 1,4-cyclohexane diol, a branched aliphatic glycol such as neopentyl glycol or 2-butyl-2-ethyl-1,3-propanediol, an aromatic glycol such as xylylene glycol, or an ethylene oxide adduct or a propylene oxide adduct of 2,2-bis(4-hydroxyphenyl)propane, may, for example, be mentioned.

Further, a tri-functional or higher functional component may be copolymerized.

As such a polyfunctional component, a tri-functional or higher functional component such as trimellitic acid, trimesic acid, pyromellitic acid, tricarballylic acid, trimethylolpropane, triethylolpropane, pentaerythritol, glycerol or tetrakis[methylene-3-(3',5'-di-t-butyl-4'-hydroxyphenylpropionate)methane, may, for example, be mentioned.

Further, if desired, the terminal ends of the polyester chain made of the above-described component, may be sealed with a monofunctional component such as stearic acid or benzoic acid.

As described above, PET of the present invention may contain various copolymer components other than the terephthalic acid component and the ethylene glycol component, but usually, at least 80 mol % of the constituting units of the polyester chain are ethylene terephthalate units. Usually, as the proportion of ethylene terephthalate units decreases, no adequate oriented crystallization tends to proceed, even if the stretch blow molded product is subjected to heat treatment, whereby the desired heat resistance tends to be hardly obtainable. The proportion of ethylene terephthalate units in PET is preferably at least 90 mol %, particularly at least 95 mol %. As described above, as the copolymer component, various types may be mentioned, but the most common is diethylene glycol. Diethylene glycol will be formed from ethylene glycol by a side reaction in the reaction system, but may be incorporated from outside the system. It is preferred that terephthalate units containing diethylene glycol are at most 5 mol %, particularly at most 3.5 mol %, of the total.

The intrinsic viscosity of PET of the present invention is from 0.6 to 0.9 dl/g. If the intrinsic viscosity is higher than this range, entanglement of the molecular chains tends to be too strong, whereby it tends to be hardly stretchable. On the other hand, if the intrinsic viscosity is lower than this range, the crystallization rate tends to be too high. Either case is not suitable for producing a stretch blow molded product having good heat resistance with good productivity. The intrinsic viscosity is preferably within a range of from 0.65 to 0.85 dl/g.

PET of the present invention is one produced by using antimony as a catalyst for polycondensation and contains antimony derived from the catalyst. Further, antimony serves as a nucleating agent for crystallization of PET. Thus, antimony has binary functions i.e. a function as a catalyst for polycondensation of PET and a function as a nucleating agent for crystallization. Accordingly, its content should be from 0.8 to 2.0 mmol/kg as an antimony element. If the content is smaller than this range, the polycondensation reaction tends to be slow, and if the content exceeds this range, the crystallization rate, when formed into a preform, is likely to be too high. The content of the antimony element in PET is preferably from 1.1 to 1.8 mmol/kg, particularly preferably from 1.2 to 1.6 mmol/kg.

Further, it is preferred to incorporate into PET a phosphorus compound, and an alkali metal compound and/or an alkaline earth metal compound, in addition to the antimony. The phosphorus compound serves as a stabilizer to suppress decomposition of PET and, on the other hand, may give some influence over the crystallization rate of PET. The phosphorus compound may usually be present in an amount of from 0.1 to 7.0 mmol/kg as phosphorus element, preferably from 0.3 to 6.0 mmol/kg, particularly preferably from 0.6 to 5.0 mmol/kg, most preferably from 2.0 to 4.0 mmol/kg.

The alkali metal compound and the alkaline earth metal compound are incorporated in an amount of from 0.4 to 8.0 mmol/kg as the total amount of the elements. Their content is preferably from 0.6 to 6.0 mmol/kg, particularly preferably from 0.8 to 4.0 mmol/kg. The alkali metal compound and/or the alkaline earth metal compound is also considered to give an influence over the crystallization rate of PET.

With respect to the crystallization peak temperatures of PET of the present invention, the temperature-rising crystallization peak temperature (Tc$_1$) is required to be at least 160° C. The temperature-rising crystallization peak temperature (Tc$_1$) is preferably at least 165° C., particularly preferably at least 170° C. Further, the temperature-dropping crystallization peak temperature (Tc$_2$) is required to be non-existent, or, if exists, is required to be at most 170° C., preferably at most 165° C., particularly preferably at most 160° C. The crystallization peak temperature is an index for the crystallization rate of the preform. Namely, the higher the Tc$_1$ and the lower the Tc$_2$, the lower the crystallization rate. When Tc$_1$ and Tc$_2$ are within the above ranges, the preform can be adequately heated without crystallization, whereby the oriented crystallization of molecules and relaxing of the orientation strain will sufficiently proceed at the time of stretching and heat treatment subsequent thereto, and the heat resistance of the resulting stretch blow molded product will accordingly be high.

With respect to the number of spherulites in PET of the present invention, the number (N$_1$) of spherulites when it is heated from room temperature to 120° C. and maintained for 10 minutes by the measuring method which will be described hereinafter, is at most $1\times10^{-2}/\mu m^2$, preferably at most $5\times10^{-3}/\mu m^2$, and the number N$_2$ of spherulites when it is cooled from 300° C. to 200° C. and maintained for 2 minutes, is at most $1\times10^{-3}/\mu m^2$, preferably at most $5\times10^{-4}/\mu m^2$, particularly preferably at most $3\times10^{-4}/\mu m^2$. The number of spherulites is an index for the crystallization rate of the preform. Namely, the smaller the number of spherulites, the lower the crystallization rate, and the higher the heat resistance of the stretch blow molded product obtainable therefrom. The crystallization peak temperature and the number of spherulites are naturally interrelated to some extent. However, the crystallization peak temperature depends also on the mobility of the molecular chains in addition to the number of spherulites. Thus, both have independent significances, respectively, as indices for the physical properties of PET.

With PET of the present invention, it is further preferred that the heating value of crystallization, the content of a cyclic trimer, the content of acetaldehyde, etc., are within specific ranges, respectively. With respect to the heating value of crystallization, the heating value ($\Delta H_1$) of crystallization at Tc$_1$ is preferably at least 25 J/g, particularly preferably at least 30 J/g, and when Tc$_2$ exists, the heating value ($\Delta H_2$) of crystallization at Tc$_2$ is preferably at most 15 J/g, particularly preferably at most 10 J/g. If $\Delta H_1$ is small, PET particles (chips) are likely to fuse one another in the crystallization step and in the solid phase polycondensation step in the process for producing PET. Further, if $\Delta H_2$ is large, the transparency of the preform tends to deteriorate. The cyclic trimer is cyclotriethylene terephthalate, and its content is preferably at most 4,000 ppm. If the content of the cyclic trimer is large, the cyclic trimer is likely to precipitate during the stretch blow molding and attach to the mold, whereby cleaning of the mold will be required. If molding is carried out with the mold to which the cyclic trimer has attached, the irregularities of the cyclic trimer on the mold will be transferred to the surface of the molded product, whereby fogging is likely to result on the appearance of the molded product. The content of the cyclic trimer is preferably as small as possible, specifically at most 3,500 ppm, particularly preferably at most 3,000 ppm. The content of acetaldehyde is preferably at most 10 ppm, particularly preferably at most 5 ppm. If a beverage is filled in a bottle made of PET having a large acetaldehyde content, the acetaldehyde is likely to elute into the beverage thereby to adversely affect the taste and fragrance.

Further, with the polyester of the present invention, it is preferred that the amount of a cyclic trimer formed as a byproduct when the polyester is re-melted, is small.

Specifically, it is preferred that the increase of cyclic trimer when the polyester is melted and heated in a nitrogen stream at 280° C. for 30 minutes, is at most 5,000 ppm. Further, the content of a cyclic trimer in the molded product made of the polyester of the present invention is preferably at most 4,500 ppm. If the increase of the cyclic trimer or the content of the cyclic trimer in the molded product exceeds the above range, adhesion of the cyclic timer to the mold, or fogging on the appearance of the molded product due to its transfer, is likely to result.

Like usual PET, PET of the present invention is produced via an esterification step of reacting a starting material comprising terephthalic acid or its ester-forming derivative, and ethylene glycol or its ester-forming derivative, as the main components, and optional other copolymer components, to form an ester comprising an oligomer of hydroxyethyl terephthalate as the main component, a melt polycondensation step of melt polycondensing this ester, and a solid phase polycondensation step of polycondensing the obtained polycondensed product in a solid state. The respective steps can be carried out either by a continuous system or a batch system, but are preferably carried out in a continuous system to produce PET having a constant quality. Especially, it is preferred to carry out the melt polycondensation step in a continuous system as the melt polycondensation step is influential substantially over the physical properties of the resulting PET.

In a preferred embodiment of the present invention, the starting material comprising terephthalic acid or its ester-forming derivative, and ethylene glycol or its ester-forming derivative, as the main components, is preliminarily mixed and supplied as a slurry to an esterification step. The composition of the slurry is usually such that the molar ratio of the ethylene glycol component to the terephthalic aid component is from 1.02 to 2.0, preferably from 1.03 to 1.7. As a preferred starting material, terephthalic acid and ethylene glycol are employed, because if a terephthalic acid ester is used as the starting material, an ester-exchange catalyst is usually required, and this ester exchange catalyst will adversely affect the crystallization characteristic of the finally obtainable PET. The esterification is carried out usually by means of a multi step reaction apparatus having a plurality of agitation tanks connected in series, under reflux of ethylene glycol, while removing water formed by the reaction and excess ethylene glycol out of the system, until the esterification reaction ratio reaches usually at least 90%, preferably at least 93%. The number average molecular weight of the obtainable esterification product is usually from 500 to 5,000. With respect to the reaction conditions, the reaction temperature in the first stage is from 240 to 270° C., preferably from 245 to 265° C., and the pressure is from 0.05 to 3 kg/cm$^2$G, preferably from 0.1 to 2 kg/cm$^2$G. Further, the reaction temperature at the final stage is from 250 to 280° C., preferably from 255 to 275° C., and the pressure is from 0 to 1.5 kg/cm$^2$G, preferably from 0 to 1.3 kg/cm$^2$G. It is preferred to adjust the increase in the esterification reaction ratio in the respective reaction stages to be substantially equal. If the esterification reaction is carried out by means of a single agitation tank, the esterification may be carried out under the reaction conditions of the final stage.

The esterification reaction can be carried out solely by the terephthalic acid component and the ethylene glycol component, but may be carried out in the presence of various additives. For example, an antimony compound as the catalyst for polycondensation, or the alkali metal compound, the alkaline earth metal compound and the phosphorus compound to be incorporated into PET, may be added to the esterification step. Further, when the esterification is carried out by an addition of a small amount of a tertiary amine such as triethylamine, tri-n-butylamine or benzyldimethylamine, a quaternary ammonium hydroxide such as tetraethylammonium hydroxide, tetra n-butylammonium hydroxide or tri-methylbenzylammonium hydroxide, or a basic compound such as lithium carbonate, sodium carbonate, potassium carbonate or sodium acetate, the side reaction to produce diethylene glycol from ethylene glycol can be suppressed, whereby it is possible to reduce the proportion of the diethylene glycol component contained in the polyester chain.

The product from the esterification step is supplied to the melt polycondensation step. The melt polycondensation is carried out usually by means of an apparatus having a plurality of reactors connected in series in the presence of an antimony catalyst, while distilling ethylene glycol produced as a byproduct out of the system under reduced pressure. As the apparatus for reaction, for example, a complete mixing type agitation tank may be used for the first stage, and a reactor of a horizontal plug flow type equipped internally with stirring vanes may be used for the second and third stages. The reaction conditions for the first stage are such that the reaction temperature is from 250 to 290° C., preferably from 260 to 280° C., and the reaction pressure is from 500 to 10 Torr, preferably from 200 to 15 Torr. The reaction conditions for the final stage are such that the reaction temperature is from 265 to 300° C., preferably from 270 to 295° C., and the reaction pressure is from 10 to 0.1 Torr, preferably from 5 to 0.5 Torr. The reaction conditions for the intermediate stage are selected to be intermediate between the two. For example, in the case of the above-mentioned three step reaction apparatus, the reaction temperature for the second stage is from 260 to 295° C., preferably from 270 to 285° C., and the reaction pressure is from 50 to 1 Torr, preferably from 30 to 2 Torr.

The melt polycondensation reaction is carried out so that the intrinsic viscosity of the resulting product will be from 0.35 to 0.75 dl/g, preferably from 0.45 to 0.70 dl/g. Most preferably, it is carried out so that the intrinsic viscosity will be from 0.50 to 0.70 dl/g. Further, it is preferred to adjust that the increase in the intrinsic viscosity in each reaction stage will be substantially equal.

In the present invention, the melt polycondensation reaction is carried out in the presence of an antimony catalyst. As the antimony catalyst, an oxide, a salt with an aliphatic or aromatic carboxylic acid, a halide, an oxyhalide, or an alcoholate, of antimony, may, for example, be mentioned. It is preferred to employ antimony trioxide, antimony acetate or an ethylene glycol-soluble antimony compound such as antimony trisethylene glycoxide. It is particularly preferred to employ antimony trisethylene glycoxide, since precipitation in the polycondensation product is little.

As mentioned above, the antimony catalyst may be added in the esterification step, but preferably supplied to the esterification reaction product to be supplied to the melt polycondensation reaction step. In such a case, it is preferred to supply also the alkali metal compound and/or the alkaline earth metal compound at the same position. As the alkali metal compound, a salt with an aliphatic or an aromatic carboxylic acid, a halide or an alcoholate, of lithium, sodium or potassium, may, for example, be used. It is preferred to employ an ethylene glycol-soluble or water-soluble compound such as sodium acetate or potassium acetate. As the alkaline earth metal compound, an oxide, a salt with an aliphatic or aromatic carboxylic acid, or a halide, of magnesium or calcium, may, for example, be used. It is preferred to employ an ethylene glycol-soluble or water-soluble compound such as calcium acetate or magnesium acetate.

It is particularly preferred that the antimony compound, and the alkali metal compound and/or the alkaline earth metal compound, are mixed, and the mixture is made into an ethylene glycol solution and supplied to the esterification reaction product during the transportation from the esterification reactor to the melt polycondensation reactor. The reason as to why this method is suitable for the production of PET, is not clearly understood. However, it is considered that a some interaction will take place between the antimony compound, and the alkali metal compound and/or the alkaline earth metal compound. Also the phosphorus compound which is preferably incorporated to the formed PET like the alkali metal compound and/or the alkaline earth metal compound, may be supplied at any stage up to the melt polycondensation reaction step. However, when the antimony compound, and the alkali metal compound and/or the alkaline earth metal compound, are supplied to the esterification reaction product in the form of an ethylene glycol solution, as mentioned above, it is preferred to supply the phosphorus compound in the slurry preparation step.

As the phosphorus compound, a phosphate such as trimethyl phosphate, triethyl phosphate, tri-n-butyl phosphate, trioctyl phosphate, triphenyl phosphate or tricresyl phosphate, an acid phosphate such as methylacid phosphate, ethylacid phosphate, isopropylacid phosphate, butylacid phosphate, dibutyl phosphate, monobutyl phosphate or dioctyl phosphate, orthophosphoric acid, or polyphosphoric acid may, for example, be used.

Further, to PET of the present invention, if desired, still other metal compounds, such as compounds of e.g. titanium, cobalt, manganese, tin, zinc or zirconium, may be incorporated. Such other metal compounds are preferably added at a stage prior to the melt polycondensation reaction step. These metal compounds are considered to have a function to suppress crystallization of the resulting PET. Further, in some cases, a function to accelerate the melt polycondensation can be expected.

The product in the melt polycondensation step is extruded in a molten state from a die in the form of strands, cooled and solidified and then cut by a cutter into chips, which are then supplied to the solid phase polymerization step. The weight of one chip is usually from 10 to 40 mg, preferably from 12 to 30 mg, particularly preferably from 15 to 25 mg. Further, the content of acetaldehyde is preferably at most 150 ppm, particularly preferably at most 80 ppm. The smaller the content of aldehyde, the better, and it is more preferably at most 60 ppm, most preferably at most 50 ppm.

In the solid phase polycondensation step, solid phase polycondensation is carried out under a temperature condition of from 190 to 230° C., preferably from 195 to 225° C. The pressure of the atmosphere is usually at most 1 $kg/cm^2G$, preferably at most 0.2 $kg/cm^2G$, when the reaction is carried out in an inert gas atmosphere such as nitrogen, argon or carbon dioxide. When the reaction is carried out in a reduced pressure atmosphere, it is usually from 0.1 Torr to 50 Torr, preferably from 0.5 Torr to 10 Torr. The temperature, the pressure, the reaction time and the inert gas flow rate for the solid phase polycondensation reaction, may suitably be selected so that PET having the desired physical properties will be formed.

Further, the chips may be subjected to preliminary crystallization at a temperature lower than the solid polycondensation, prior to supplying them to the solid phase polycondensation. For example, the chips may be heated in a dry state from 120 to 200° C., preferably from 130 to 180° C., for 1 minute to 4 hours, or the chips may be heated in an atmosphere containing steam from 120 to 200° C. for at least 1 minute, before supplying them to the solid phase polycondensation. Further, the chips subjected to the solid phase polycondensation may be subjected to steam treatment by maintaining them in an atmosphere containing steam of at least 60° C. for at least 30 minutes, or to water treatment by dipping them in water of at least 40° C. for at least 10 minutes, in order to deactivate the polycondensation catalyst contained in them.

PET of the present invention can be formed into various molded products by conventional methods. For example, it may be formed into a sheet, and then this sheet is used for drawing to prepare a container. Preferably, PET of the present invention is formed into a bottomed tubular preform by injection molding, and then this preform is subjected to stretch blow molding to produce a bottle for a beverage, which may be sterilized and filled under heating. The temperature conditions for the injection molding are such that the mold temperature is from 0 to 30° C., and the resin temperature is from the melting point to 350° C., preferably from the melting point +10° C. to 320° C. The temperature for reheating the preform in the stretch blow molding is from 70 to 130° C., preferably from 80 to 125° C., and the mold temperature is from room temperature to 200° C., preferably from room temperature to 180° C. Further, in a case where heat treatment is applied to the molded product in order to improve the heat resistance, such heat treatment may be carried out at a temperature of from 70 to 200° C., preferably from 90 to 180° C. The temperature is most preferably from 120 to 160° C. Further, at the time of producing a molded product, a nucleating agent, a lubricant, a stabilizer, an antistatic agent, an antifogging agent, a colorant or any other commonly employed additives may be incorporated, as the case requires.

Now, the present invention will be described in further detail with reference to Examples. However, it should be understood that the present invention is by no means restricted by such specific Examples. Measurements of the physical properties in Examples were carried out as follows.
Content of metal elements 2.0 g of PET was ashed by a conventional method in the presence of sulfuric acid, and the ash was dissolved in 100 ml of distilled water. Metal elements in this solution were quantitatively analyzed by ICP emission spectral analysis.
Content of copolymer component PET was dissolved in deutrated trifluoroacetic acid at room temperature to obtain a 3 wt % solution. Using JNM-EX270 NMR apparatus manufactured by Nippon Denshi K.K., $^1$H-NMR of this solution was measured, and the amount of the copolymer component was calculated.
Intrinsic viscosity 5 g of PET was freeze-pulverized. From the obtained pulverized product, 0.25 g was sampled and dissolved in a solvent mixture of phenol/tetrachloroethane (weight ratio of 1/1).

The dissolution was carried out by maintaining it at 110° C. for 30 minutes in the case of the melt polycondensation product and at 120° C. for 30 minutes in the case of the solid phase polycondensation product. The relative viscosity ($\eta$rel) of this solution was measured at 30° C. by means of an Ubbelohde type capillary viscosity tube. This measurement was carried out with respect to each of solutions having concentrations of 1 g/dl, 0.5 g/dl, 0.2 g/dl and 0.1 g/dl, and the value of ($\eta$rel–1)/C to the concentration C (g/dl) was plotted on a plotting paper, and the value of (ηrel−1)/C at C=0, was obtained by extrapolation and was taken as the intrinsic viscosity η (dl/g).

Crystallization peak temperature and heating value of crystallization

The surface of a PET chip was cut off by a cutter knife to obtain about 7 mg of the center portion. This sample was sealed in a standard sample pan (Product No. 0219-0041) made of aluminum for DSC (differential scanning calorimeter) manufactured by Parkin Elmer Co. The pan was put in a Labostar Vacuum Oven LHV-112 Model vacuum dryer, manufactured by Tabai K.K., and dried at 120° C. under 5 mmHg or lower for 16 hours. The sample subjected to such treatment, was heated from 20° C. to 300° C. at a temperature raising rate of 20° C./min in a nitrogen stream by means of a DSC-7 Model differential scanning calorimeter manufactured by Parkin Elmer Co. After maintaining it at 300° C. for 10 minutes, it was rapidly cooled to 20° C. at a temperature lowering rate of 500° C./min. After maintaining at 20° C. for 10 minutes, it was again heated to 300° C. at a temperature raising rate of 10° C./min, and after maintaining at 300° C. for 10 minutes, it was cooled to 20° C. at a temperature dropping rate of 20° C./min.

The heating value in the process of heating the rapidly cooled product to 300° C. at 10° C./min, was plotted against the temperature, and the peak of the obtained exothermic curve was designated as $Tc_1$ (° C.). Likewise, the heating value was plotted against the time, and the area defined by the obtained exothermic curve and the base line, i.e. the time-integrated value of the heating value was designated as $\Delta H_1$ (j/g).

Further, likewise, the heating value in the process of cooling the product from 300° C. to 20° C. at a temperature-dropping rate of 20° C./min, was plotted against the temperature, and the peak of the obtained exothermic curve was designated as $Tc_2$ (° C.), and likewise, the heating value was plotted against time, and the area defined by the obtained exothermic curve and the base line, was designated as $\Delta H_2$ (j/g).

Number of spherulites

A PET chip was put in a Labostar Vacuum Oven LHV-112 Model vacuum dryer, manufactured by Tabai K.K. and dried at 120° C. under 5 mmHg or lower for 16 hours. Then, from the PET chips, about 1 mg of the center portion was cut out by a cutter knife and placed on a cover glass preliminarily heated to 300° C. on a TH600 Model hot stage, manufactured by Linkam K.K., attached to a OPTIPHOTO-POL Model polarization microscope manufactured by Nippon Kogaku K.K. and maintained in a nitrogen stream at 300° C. for 4 minutes. Then, it was covered with another cover glass heated to 300° C., and maintained at 300° C. for 1 minute. As the cover glass, Trophy 18×18 manufactured by Matsunami Glass K.K. was employed. Further, on the above-mentioned cover glass, a weight of 13 g heated to 300° C., was placed and maintained at 300° C. for 30 seconds. The weight was removed, and the sample was maintained in a nitrogen stream at 300° C. for 4 minutes and then put into a bath of dry ice/ethanol and rapidly cooled to obtain a thin specimen having a thickness of about 10 μm sandwiched between cover glasses. In the above process, as the pair of cover glasses, ones thoroughly washed and then subjected to platinum coating at a coating current of 8 mA for a coating time of 60 seconds by means of a 1B-13 Model coater manufactured by Eiko K.K. and then left to stand in vacuum for at least 5 minutes for stabilization, were employed.

The thin specimen obtained as described above, was heated from 20° C. to 120° C. at a temperature raising rate of 90° C./min on a hot stage of a polarization microscope and maintained at 120° C. for 10 minutes, whereupon it was photographed. The photograph was enlarged to 470 magnifications, and the number of spherulites within an area of 115×155 mm was measured and taken as the number of spherulites in a case where the sample was heated and maintained at 120° C. for 10 minutes.

Further, a melt of 300° C. prior to putting into the dry ice/ethanol bath, obtained in the same manner as described above, was cooled to 200° C. at a temperature dropping rate of 90° C./min on the hot stage of the polarization microscope and maintained at 200° C. for 2 minutes, whereupon it was photographed. The photograph was enlarged to 470 magnifications, and the number of spherulites within an area of 115×155 mm was measured and taken as the number of spherulites in a case where the sample was gradually cooled and maintained at 200° C. for 2 minutes. In each case, the photograph was taken at a portion of from 50 to 1,000 μm from the edge of the thin specimen, where crystals other than spherulties, such as crystallites or transcrystals, were not formed. Further, with a sample maintained at 120° C. for 10 minutes, spherulites may sometimes be in contact with one another, but they were calculated as separate spherulites, respectively.

Content of cyclic trimer 200 mg of PET chips or blow molded bottle product was dissolved in 2 ml of a mixed liquid of chloroform/hexafluoroisopropanol (volume ratio of 3/2), and further diluted by an addition of 20 ml of chloroform. To this solution, 10 ml of methanol was added. Precipitates were removed by filtration to obtain a filtrate. This filtrate was evaporated to dryness, and the residue was dissolved by an addition of 25 ml of dimethylformamide. The cyclic trimer in this solution was quantitatively analyzed by LC-10A Model liquid chromatograph manufactured by Shimadzu Corporation.

Content of cyclic trimer formed as a byproduct when re-melted 20 g of PET chips were put into a test tube having a protrusion at the bottom and vacuum-dried for 2 hours by dipping the test tube in an oil bath of 160° C. under a nitrogen stream. This test tube was taken out from the oil bath and left to cool in vacuum, and at the same time, the oil bath was heated and when it became 280° C., the test tube was again immersed in the oil bath to have the PET chips melted. 30 Minutes later, the test tube was taken out from the oil bath, and the protrusion at the bottom was broken, and the melt was withdrawn in water in the form of a strand and then pelletized. The weight of each pellet obtained was from 15 to 25 mg. The content of the cyclic trimer of the pellet thus obtained was measured by the above-described measuring method, and from this value, the content of the cyclic trimer in the PET chips prior to the re-melting, was subtracted to obtain an amount which was taken as the amount of the cyclic trimer formed as a byproduct when the sample was re-melted.

Content of acetaldehyde 5.0 g of PET chips were put together with 10.0 ml of pure water into a micro bomb having an internal capacity of 50 ml in a nitrogen atmosphere and sealed. This micro bomb was heated at 160° C. for 2 hours, and acetaldehyde in water was quantitatively analyzed by GC-14A gas chromatograph manufactured by Shimadzu Corporation using isobutyl alcohol as an internal standard.

The acetaldehyde content was represented by the ratio (ppm) to the weight of PET.

Hue

PET chips were measured by a reflection method by means of 300A Model color difference meter, manufactured by Nippon Denshoku Kogyo K.K. At the time of measurement, after the power source was switched on, the apparatus was preliminarily left for at least 4 hours and sufficiently stabilized, and then a measuring cell having an inner diameter of 36 mm and a depth of 15 mm (the light-receiving portion was made of quartz glass), was filled with the chips, and with respect to each sample, the direction of the measuring cell was changed to four directions each by 90°, and L/a/b was measured in a total of 4 times, and the average value was taken. The higher the value L, the better the hue without black hue.

Evaluation of moldability of a bottle

PET chips subjected to the solid phase polymerization, were sufficiently dried. Using an injection molding machine "FE-80S", manufactured by Nissei Jushi Kogyo K.K., a test tube-like preform having a height of 165 mm, a tubular outer diameter of 29.0 mm, an average wall thickness of 3.7 mm and a weight of 60 g, was injection-molded at a resin temperature of 280° C. under a back pressure of about 5 kg/cm$^2$ at an injection rate of about 45 cc/sec under a maintained pressure of about 30 kg/cm$^2$ at a mold temperature of 20° C. in a molding cycle of about 40 seconds.

This preform was introduced into a near infrared ray irradiation furnace equipped with a quartz heater and heated for 62, 64, 66, 68, 70, 72, 74 or 76 seconds under a predetermined output, then left to stand for 25 seconds at room temperature to unify the temperature distribution in the interior of the preform. Then, the preform was immediately put in a mold adjusted to 160° C., and while stretching in the direction of the height of the bottle by a stretching rod, subjected to blowing at a blowing pressure of about 7 kg/cm$^2$ for 1 second and then at about 30 kg/cm$^2$ for 5 seconds and then maintained for 5 seconds while exerting the blow pressure. After cooling in air, the molded product was taken out to obtain a bottle having a capacity of about 1.5 l and an average wall thickness at the body portion of 350 μm.

The shape of the obtained bottle was visually evaluated, the maximum heating time of the preform which gave a bottle having a good shape and a uniform wall thickness without deviation, was designated as Tmax (seconds).

With respect to each sample, a bottle molded for the heating time Tmax (seconds) was stored for one week in an environment where the temperature was 40° C. and the humidity was 75%. Then, hot water of 90° C. was poured into this bottle fully at room temperature and then sealed, and it was laterally laid for 1 minute and then left to stand vertically for 5 minutes. Then, it was cooled for 20 minutes in water of 10° C. The shape of the bottle was visually inspected, whereby one having good heat resistance without any change in the shape, was designated by "⊙", one having no substantial problem although a certain deformation was observed at the body portion, was designated by "O", one with a deformation at the body portion and heat resistance being inadequate, was designated by "Δ", and one with a substantial deformation at the body portion and heat resistance being very poor, was designated by "X".

EXAMPLES 1 to 4 and COMPARATIVE EXAMPLES 1 to 3

Polyethylene terephthalate was continuously produced by means of a continuous polymerization apparatus comprising a slurry preparation tank composed of one agitation tank shown in FIG. 1, an esterification reactor composed of two agitation tanks connected in series and a melt polycondensation reactor composed of an agitation tank and two lateral plug flow type reactors following it.

A slurry was prepared by supplying to the slurry preparation tank 1 an ethylene glycol solution of orthophosphoric acid (concentration: 3.0 wt %), terephthalic acid and ethylene glycol so that terephthalic acid:ethylene glycol= 1941:676 (weight ratio). This slurry was continuously supplied to the esterification reactor. The reaction conditions for the esterification reactor were such that the first stage 2 was carried out in a nitrogen atmosphere at 260° C. under 0.5 kg/cm$^2$G for an average residence time of 4 hours, and the second stage 3 was carried out likewise in a nitrogen atmosphere at 260° C. under 0.05 kg/cm$^2$G for an average residence time of 1.5 hours.

The esterification reaction product was continuously supplied to the melt polycondensation reactor via a conduit 5. At an intermediate position of the conduit 5, a solution having an alkali metal compound and/or an alkaline earth metal compound, and antimony trioxide dissolved in ethylene glycol (antimony trioxide concentration: 0.84 wt %), was continuously added to the esterification reaction product via a conduit 4. The reaction conditions for the melt polycondensation reactor were such that the first stage 6 was carried out at 270° C. under 20 Torr for an average residence time of 1.2 hours, and the second stage 7 was carried out at 278° C. under 4 Torr for an average residence time of 1.2 hour, and the third stage 8 was carried out at 280° C. under 2 Torr for an average residence time of 1.2 hours. The melt polycondensation reaction product was extruded from a die in the form of strands and cooled and solidified, and then cut by a cutter into chips each having a weight of about 24 mg.

The chips were continuously supplied to a crystallizer maintained at about 160° C. in a nitrogen atmosphere and maintained for about 5 minutes with stirring, and then continuously supplied to a tower type solid phase polycondensation apparatus and subjected to a solid phase polycondensation reaction in a nitrogen atmosphere at 205° C. The results are shown in Table 1.

TABLE 1

|  | Ex. 1 | Ex. 2 | Ex. 3 | Ex. 4 |
|---|---|---|---|---|
| Copolymer units (mol %) containing diethylene glycol component | 3.1 | 3.1 | 3.0 | 2.7 |
| Copolymer units (mol %) containing isophthalic acid component | 0 | 0 | 0 | 0 |

TABLE 1-continued

| | | | | |
|---|---|---|---|---|
| Added alkali (alkaline earth) metal compound | Magnesium acetate tetra-hydrate | Magnesium acetate tetra-hydrate | Calcium acetate | potassium acetate |
| Solid phase polycondensation time (hr) | 15 | 25 | 15 | 15 |
| Antimony content (mmol/kg) | 1.48 | 1.48 | 1.48 | 1.48 |
| Alkali (alkaline earth) metal content (mmol/kg) | 2.35 | 2.35 | 2.07 | 2.06 |
| Phosphorus content (mmol/kg) | 2.97 | 2.97 | 2.91 | 2.91 |
| Intrinsic viscosity (dl/g) | 0.78 | 0.86 | 0.80 | 0.80 |
| Crystallization peak temperature ($Tc_1$) (° C.) | 167.2 | 170.2 | 172.3 | 162.8 |
| Heating value of crystallization ($\Delta H_1$) (J/g) | 33.9 | 36.17 | 33.3 | 33.7 |
| Crystalliztion peak temperature ($Tc_2$) (° C.) | 158.5 | 157.7 | 156.6 | 160.5 |
| Heating value of crystallization ($\Delta H_2$) (J/g) | 6.69 | 6.1 | 6.08 | 6.8 |
| Number of spherulites at 120° C. (number/$\mu m^2$) | $4.3 \times 10^{-3}$ | $2.8 \times 10^{-3}$ | $1.5 \times 10^{3}$ | $7.5 \times 10^{-3}$ |
| Number of spherulites at 200° C. (number/$\mu m^2$) | $2.7 \times 10^{-4}$ | $2.2 \times 10^{-4}$ | $1.4 \times 10^{-4}$ | $2.9 \times 10^{-4}$ |
| Cyclic trimer content (ppm) | 2800 | 2500 | 2900 | 3300 |
| Amount of cyclic trimer formed as byproduct during re-melting (ppm) | 4500 | 4600 | 4500 | 4900 |
| Acetaldehyde content (ppm) | 2.9 | 2.7 | 2.9 | 2.8 |
| Hue (L/a/b) | 88.2/0.1/0.1 | 88.0/0.1/0.3 | 88.5/0.3/−0.2 | 87.7/0.1/0.1 |
| Moldability of bottle Tmax (sec) | 72 | 72 | 74 | 70 |
| Shape of bottle | ⊚ | ⊚ | ⊚ | ○ |
| Amount of cyclic trimer in bottle (ppm) | 3100 | 2900 | 3500 | 4300 |

| | Comp. Ex. 1 | Comp. Ex. 2 | Comp. Ex. 3 |
|---|---|---|---|
| Copolymer units (mol %) containing diethylene glycol component | 2.9 | 1.8 | 2.8 |
| Copolymer units (mol %) containing isophthalic acid component | 0 | 0 | 1.8 |
| Added alkali (alkaline earth) metal compound | — | Magnesium acetate tetra-hydrate | — |
| Solid phase polycondensation time (hr) | 15 | 15 | 15 |
| Antimony content (mmol/kg) | 1.23 | 2.26 | 1.73 |
| Alkali (alkaline earth) metal content (mmol/kg) | — | 1.23 | — |
| Phosphorus content (mmol/kg) | 0.61 | 0.74 | 1.07 |
| Intrinsic viscosity (dl/g) | 0.81 | 0.79 | 0.78 |
| Crystallization peak temperature | 157.8 | 149.2 | 156.3 |

TABLE 1-continued

| | | | |
|---|---|---|---|
| $(Tc_1)$ (° C.) | | | |
| Heating value of crystallization $(\Delta H_1)$ (J/g) | 32.4 | 33.5 | 28.7 |
| Crystallization peak temperature $(Tc_2)$ (° C.) | 162.3 | 168.3 | 159.2 |
| Heating value of crystallization $(\Delta H_2)$ (J/g) | 4.7 | 14.7 | 5.5 |
| Number of spherulites at 120° C. (number/$\mu m^2$) | $1.2 \times 10^{-2}$ | $1.7 \times 10^{-2}$ | $8.2 \times 10^{-3}$ |
| Number of spherulites at 200° C. (number/$\mu m^2$) | $3.2 \times 10^{-4}$ | $3.6 \times 10^{-4}$ | $1.8 \times 10^{-4}$ |
| Cyclic trimer content (ppm) | 3800 | 4400 | 4100 |
| Amount of cyclic trimer formed as byproduct during re-melting (ppm) | 5700 | 5600 | 4900 |
| Acetaldehyde content (ppm) | 4.6 | 5.7 | 5.5 |
| Hue (L/a/b) | 87.0/0.2/−0.5 | 85.2/0.1/0.5 | 85.6/0.2/0.2 |
| Moldability of bottle Tmax (sec) | 64 | 64 | 66 |
| Shape of bottle | Δ | x | x |
| Amount of cyclic trimer in bottle (ppm) | 4800 | 3800 | 4500 |

Note 1: The chips made of the melt polycondensation product in Example 1, had an intrinsic viscosity of 0.59 dl/g and an acetaldehyde content of 44 ppm.

Note 2: The chips made of the melt polycondensation product in Comparative Example 1, had an intrinsic viscosity of 0.62 dl/g and an acetaldehyde content of 48 ppm.

Note 3: The chips made of the melt polycondensation product in Comparative Example 2, had an intrinsic viscosity of 0.62 dl/g and an acetaldehyde content of 47 ppm.

Note 4: In Comparative Example 3, terephthalic acid was supplied at a rate of 1,906 parts by weight/hr, and isophthalic acid was supplied at a rate of 35 parts by weight/hr, instead of supplying terephthalic acid at a rate of 1,941 parts by weight/hr. Further, the chips made of the melt polycondensation product had an intrinsic viscosity of 0.62 dl/g and an acetaldehyde content of 46 ppm.

Note 5: In Comparative Examples 1 and 3, antimony trioxide was supplied to the second stage of the esterification reaction tank in the form of an ethylene glycol solution (concentration: 1.8 wt %).

The polyester of the present invention, or the polyester obtained by the process of the present invention, is PET produced by means of an antimony catalyst, and a container obtained by stretch blow molding of a preform made thereof can have high heat resistance useful for sterilization and filling under heating. Further, the cyclic trimer content is so little that there will be no adhesion to the mold during molding, and there will be no deterioration of the outer appearance of the molded product. Further, the acetaldehyde content is also so little that it scarcely elute into the content and influence over the taste or fragrance, and thus the polyester is suitable for use as a container for a beverage to be sterilized and filled under heating.

What is claimed is:

1. A polyester comprising:
   1) a polymer structure comprising ethylene terephthalate units as the main component of the polymer;
   2) an intrinsic viscosity ranging from 0.6 to 0.9 dl/g as determined on the basis of relative viscosities measured from solutions having various concentrations prepared by dissolving a 0.25 g sample of the polymer dissolved in a solvent of 1:1 weight ratio of phenol to tetrachlorethane at 30° C. in an Ubbelohde capillary viscosity tube;
   3) an antimony content of 0.8 to 2.0 mmol/kg;
   4) a temperature-rising crystallization peak temperature $(Tc_1)$ of at least 160° C., and a temperature-dropping crystallization peak temperature $(Tc_2)$ of at most 170° C. or non-existent, and
   5) a structure in which the polyester is constituted of spherulites of polyester in a number $(N_1)$ and a number $(N_2)$, wherein upon heating a specimen of the polyester from room temperature to 120° C. and maintained for 10 minutes at the elevated temperature, the number $(N_1)$ of spherulites is at most $1 \times 10^{-2}/\mu m^2$ and upon cooling of a heated polyester specimen from 300° C. to 200° C. and maintained at 200° C. for 2 minutes, the number $(N_2)$ of spherulites is at most $1 \times 10^{-3}/\mu m^2$.

2. The polyester according to claim 1, which contains from 0.4 to 8.0 mmol/kg of a metal element selected from the group consisting of alkali metals and alkaline earth metals.

3. The polyester according to claim 1, which contains from 0.1 to 7.0 mmol/kg of phosphorus.

4. The polyester according to claim 1, wherein the content of antimony is from 1.1 to 1.8 mmol/kg, the content of metal element selected from the group consisting of alkali metals and alkaline earth metals is from 0.6 to 6.0 mmol/kg, and the content of phosphorus from 0.3 to 6.0 mmol/kg.

5. The polyester according to claim 1, wherein the temperature-rising crystallization peak temperature $(Tc_1)$ is at least 165° C., and the temperature-dropping crystallization peak temperature $(Tc_2)$ is at most 165° C. or non-existent.

6. The polyester according to claim 1, wherein the number ($N_1$) of spherulites when the polyester is heated from room temperature to 120° C. and maintained for 10 minutes is at most $5 \times 10^{-3}/\mu m^2$, and the number ($N_2$) of spherulites when the polyester is cooled from 300° C. to 200° C. and maintained for 2 minutes is at most $5 \times 10^{-4}/\mu m^2$.

7. The polyester according to claim 1, wherein the heating value ($\Delta H_1$) of crystallization at the temperature-rising crystallization peak temperature is at least 25 J/g, and when the temperature-dropping crystallization peak temperature exists, the heating value ($\Delta H_2$) of crystallization at that temperature is at most 15 J/g.

8. The polyester according to claim 1, wherein the content of a cyclic trimer is at most 4,000 ppm, and the content of acetaldehyde is at most 10 ppm.

9. The polyester according to claim 1, wherein the content of antimony is from 1.2 to 1.6 mmol/kg, the content of a metal element selected from the group consisting of alkaline earth metals is from 0.8 to 4.0 mmol/kg, the content of phosphorus is from 2.0 to 4.0 mmol/kg, and the increase of a cyclic trimer when the polyester is melted and heated in a nitrogen stream at 280° C. for 30 minutes, is at most 5,000 ppm.

10. In a process for producing a polyester comprising ethylene terephthalate units as the main component of the polyester, which comprises:

reacting a starting material comprising terephthalic acid or an ester-forming derivative thereof and ethylene glycol or an ester-forming derivative thereof as the main components thereby forming an ester comprising an oligomer of hydroxyethyl terephthalate as the main component, continuously melt polycondensing the esterification reaction product formed in the esterification step in the presence of an antimony compound, and polycondensing the polycondensed product obtained in the solid state, the polyester thereby produced having:
1) an intrinsic viscosity ranging from 0.6 to 0.9 dl/g as determined on the basis of relative viscosities measured from solutions having various concentrations prepared by dissolving a 0.25 g sample of the polymer dissolved in a solvent of 1:1 weight ratio of phenol to tetrachlorethane at 30° C. in an Ubbelohde capillary viscosity tube;
2) an antimony content of 0.8 to 2.0 mmol/kg;
3) a temperature-rising crystallization peak temperature ($Tc_1$) of at least 160° C., and a temperature-dropping crystallization peak temperature ($Tc_2$) of at most 170° C. or non-existent, and
4) a structure in which the polyester is constituted of spherulites of polyester in a number ($N_1$) and a number ($N_2$), wherein upon heating a specimen of the polyester from room temperature to 120° C. and maintained for 10 minutes at the elevated temperature, the number ($N_1$) of spherulites is at most $1 \times 10^{-2}/\mu m^2$ and upon cooling of a heated polyester specimen from 300° C. to 200° C. and maintained at 200° C. for two minutes, the number ($N_2$) of spherulites is at most $1 \times 10^{-3}/\mu m^2$, and wherein the antimony compound and a metal compound selected from the group consisting of alkali metal compounds and alkaline earth metal compounds are supplied in the process in the form of an ethylene glycol solution wherein both are co-existent, to the reaction system at a stage prior to admitting the esterification reaction product to the melt polycondensation step.

11. In a process for producing a polyester comprising ethylene terephthalate units as the main component of the polyester, which comprises:

preparing a slurry of a starting material comprising a carboxylic acid component containing terephthalic acid as the main component thereof and a polyol component comprising ethylene glycol as the main component thereof;

conducting esterification of the slurry components thereby forming an oligomer of hydroxyethyl terephthalate as the main component, continuously melt polycondensing the esterification reaction product formed in the esterification step in the presence of an antimony compound, and polycondensing the polycondensed product obtained in the solid state, the polyester thereby produced having:
1) an intrinsic viscosity ranging from 0.6 to 0.9 dl/g as determined on the basis of relative viscosities measured from solutions having various concentrations prepared by dissolving a 0.25 g sample of the polymer dissolved in a solvent of 1:1 weight ratio of phenol to tetrachlorethane at 30° C. in an Ubbelohde capillary viscosity tube;
2) an antimony content of 0.8 to 2.0 mmol/kg;
3) a metal element content of from 0.4 to 8.0 mmol/kg of a metal selected from the group consisting of alkali metals and alkaline earth metals;
4) a phosphorus content of from 0.1 to 7.0 mmol/kg;
5) a temperature-rising crystallization peak temperature ($Tc_1$) of at least 160° C., and a temperature-dropping crystallization peak temperature ($Tc_2$) of at most 170° C. or non-existent, and
6) a structure in which the polyester is constituted of spherulites of polyester in a number ($N_1$) and a number ($N_2$), wherein upon heating a specimen of the polyester from room temperature to 120° C. and maintained for 10 minutes at the elevated temperature, the number ($N_1$) of spherulites is at most $1 \times 10^{-2}/\mu m^2$ and upon cooling of a heated polyester specimen from 300° C. to 200° C. and maintained at 200° C. for two minutes, the number ($N_2$) of spherulites is at most $1 \times 10^{-3}/\mu m^2$, wherein said phosphorus compound is supplied to the process in the slurry preparation step, and wherein said antimony compound and an alkali metal or alkaline earth metal compound are supplied in the form of an ethylene glycol solution, wherein both are coexistent, to the process at the melt polycondensation step.

* * * * *